(12) United States Patent
Dotson

(10) Patent No.: US 6,317,949 B1
(45) Date of Patent: Nov. 20, 2001

(54) DEVICE FOR BANDING TOGETHER COMPONENTS OF A FISHING LURE

(76) Inventor: Allen Ray Dotson, P.O. Box 1847, Bullhead City, AZ (US) 86442

( * ) Notice: Subject to any disclaimer, the term of this patent is extended or adjusted under 35 U.S.C. 154(b) by 0 days.

(21) Appl. No.: 09/448,533

(22) Filed: Nov. 22, 1999

(51) Int. Cl.7 .................................................... B23P 19/02
(52) U.S. Cl. ................................. 29/235; 29/813; 29/280; 29/270
(58) Field of Search ................................. 29/811.2, 813, 29/816, 817, 235, 270, 278, 280, 450; 43/42.53, 4, 42.24

(56) References Cited

U.S. PATENT DOCUMENTS 4,466,166 * 8/1984 Hogarth .................................. 29/235

FOREIGN PATENT DOCUMENTS

19883 * 7/1906 (GB) ..................................... 29/450

\* cited by examiner

Primary Examiner—David P. Bryant
Assistant Examiner—Jermie E. Cozart
(74) Attorney, Agent, or Firm—Philip J. Anderson; Anderson & Morishita

(57) ABSTRACT

A device and method for placing band on bait for connecting bait first and second components is set forth which includes a loader having a barrel with at one end a retainer to hold the first component against the end of the barrel and at the other end a smaller diameter handle. An elastic band is provided to be received over the handle and to elastically expand as it is passed such as by sliding or rolling from the handle onto the barrel. As the band is moved off of the barrel end it contracts about the bait to provide a band on the bait for holding, for example, a hook or to band together first and second lure components. The retainer may be a barb or a clip. Further means may be provided to interchange between the type of retainer.

19 Claims, 4 Drawing Sheets

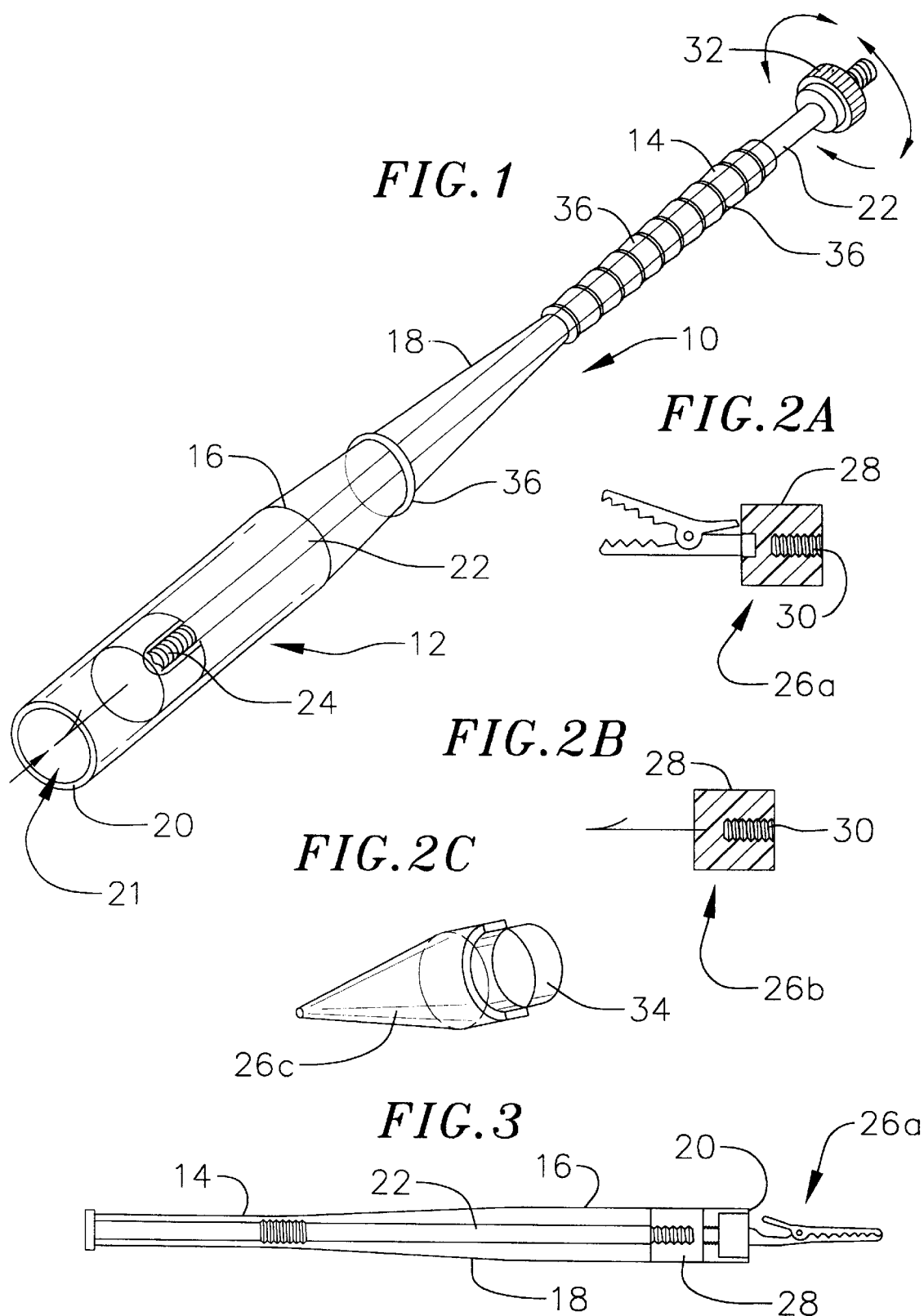

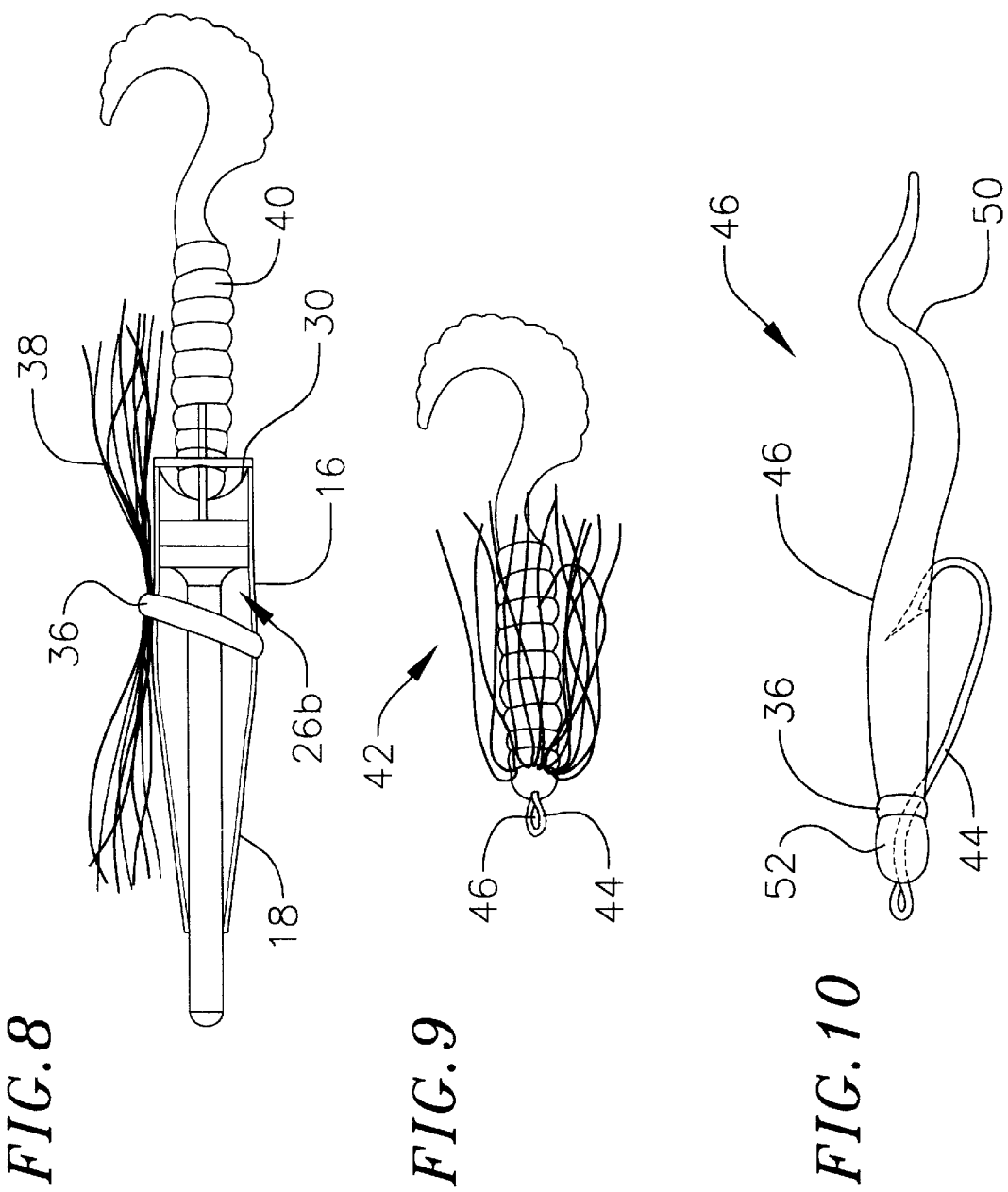

DEVICE FOR BANDING TOGETHER COMPONENTS OF A FISHING LURE

FIELD OF THE INVENTION

The present invention relates to systems and methods for connecting together components to form a composite fishing lure or fishing bait.

BACKGROUND

Typically fishermen purchase various shape, sizes and configurations of fishing lures and store them in their tackle box. When fishing, they may switch from one type of lure to another hoping to find one that attracts fish. Some such lures are of the type having two or more components such as, for example, a body (which typically includes a hook secured to the body as by molding a plastic body about the hook) and a skirt or hackle. The skirt or hackle, which typically is represented by feathers or a collection of plastic or rubber segments, is attached to the body as by being molded, glued or otherwise permanently attached.

Another type of lure or bait which is used is a worm, minnow or other live bait or a plastic or synthetic copy of live bait such as a plastic worm or the like. Where worms (live or plastic) are used, the bait may come off the hook during casting, trolling, hitting a snag or as a result of strike. The loss of the bait is frustrating in that the fisherman wastes time fishing with a rig which has, unbeknownst to the fisherman, lost the bait. Furthertime is consumed in re-baiting the rig.

It would be useful to provide a device where the fisherman can create his/her own lure in the field quickly and easily by connecting components together and/or which can be used to retain bait to a hook and which can further be used to attach components such as skirts or hackles to live or synthetic bait.

SUMMARY OF THE INVENTION

There is, therefore, set forth according to the present invention a device and method which provides for the quick, easy and simple attachment of lure components to fashion a lure and for attaching components to live or artificial baits to configure a fishing lure of a desired configuration. The device and method also provides for securing live or artificial bait to a hook so as to resist loss of the bait.

Toward this end a device is set forth for placing band on bait for connecting bait first and second components which includes a loader having a barrel with at one end a retainer to hold the first component against the end of the barrel and at the other end a smaller diameter handle. An elastic band is provided to be received over the handle and to elastically expand as it is passed such as by sliding or rolling from the handle onto the barrel. As the band is moved off of the barrel end it contracts about the bait to provide a band on the bait for holding, for example, a hook or to band together first and second lure components.

The retainer may be a barb or a clip. Further means may be provided to interchange between the type of retainer.

The method includes providing a loader having a handle and an enlarged barrel with a barrel end and a retainer at the end of the barrel for retaining the bait component and attaching the bait component to the loader at the retainer. An elastic band is rolled and pushed from the handle over the barrel and off of the barrel end, the band expanding to pass over the barrel and contracting about the bait component to define a band thereon and removing the banded component from the retainer. The band provides for retention of a second bait component or a hook to the first bait component by creating radial constriction about the lure and hook shaft.

In a further aspect, a cone may be mounted at the barrel end to expand the band of a previously banded component and locate the banded component on the barrel. The cone is removed and a second bait component is disposed at the barrel end. The band and first component are moved off of the barrel end whereupon the band contracts to couple the first and second components together.

As can be appreciated, the fisherman can assemble components to create their own lure and bait combinations by using the invention. For example, the fisherman may take feathers or lengths of rubber or silicone strings or bands, gather them in a desired configuration and band them together to fashion a skirt or hackle and thereafter attach the skirt or hackle to a lure body, live or artificial bait or hook using the same band. Further, the fisherman can band bait to the hook to further secure it thereto. Thus the fisherman can fashion his own lures or bait combinations, flies or the like.

BRIEF DESCRIPTION OF THE DRAWINGS

These and other features and advantages will become appreciated as the same becomes better understood with reference to the description, claims and drawings wherein:

FIG. 1 illustrates a perspective view of the loader according to the present invention;

FIGS. 2A–2C illustrate various components for use with the loader of FIG. 1;

FIG. 3 is a side view of the loader with a clip retainer connected thereto;

FIGS. 7 and 8 show attachment of the skirt or hackle to a lure body;

FIG. 9 shows the completed lure of FIGS. 7 and 8;

FIG. 10 shows another type of banded bait of lure fashioned according to the present invention;

DESCRIPTION

Figure 4:
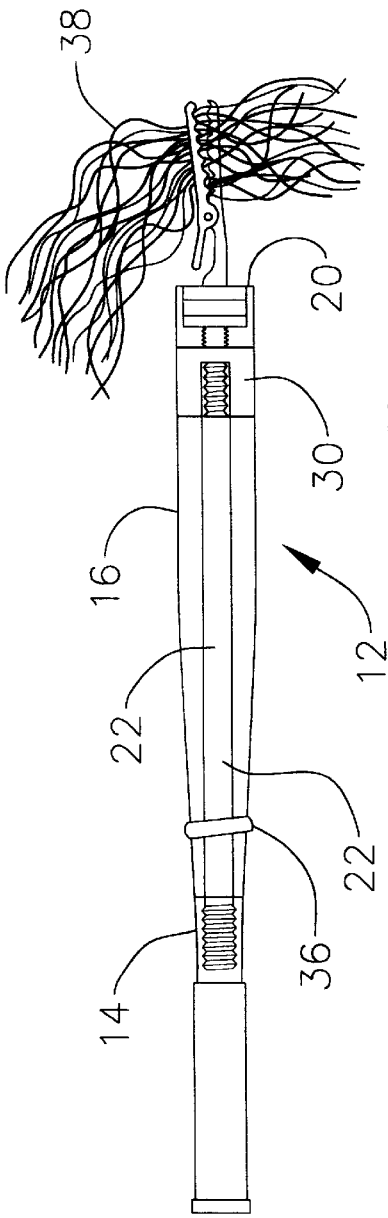
FIGS. 4 and 5 are side views of the loader of FIG. 3 for fashioning a skirt or hackle for a lure.

Turning to the drawings, FIGS. 1 and 3 show a device 10 according to the present invention. The device 10 includes a loader 12 having a handle 14 and an enlarged barrel 16. As shown, the loader 12 is in the shape of a baseball bat and includes a conical, smooth transition surface 18 between the handle 14 and the barrel 16. The barrel 16 has an end 20 opposite the handle 14.

The barrel 16 and handle 14 are hollow defining a bore 21 to receive and support a shaft 22. The shaft 22 is rotatable and axially moveable relative to the handle 14 and barrel 16 for purposes which will hereinafter become evident.

At the barrel end 20, the device 10 is adapted to receive and mount an implement or fixture. In one embodiment the fixture may be removably coupled to the barrel end by suitable means such as a threaded connection, bayonet connection or other mechanical connecting means. Preferably, to mount fixtures at the barrel end 20, the shaft 22 opposite the handle portion includes means for coupling a fixture thereto such as by having a threaded end 24.

Turning to FIGS. 2A–2C various fixtures are shown for mounting at the barrel end 20. In FIG. 2A there is shown a clip 26a, such as an alligator clip, disposed on a cylindrical mount 28. The mount 28 has an axial, threaded bore 30, to treadably couple with the shaft threaded end 24 as suggested in FIGS. 1 and 3. To mount the clip 26a, the shaft threaded end 24 is axially extended from the bore 21 and the mount is threaded onto the shaft 22 as by rotating the shaft 22. To provide a gripping surface for rotation of the shaft, a knurled wheel 32 is disposed on the shaft 22. As mounted to the shaft 22, the mount 28 and clip 26a may be drawn into the bore 21 to selectively locate the clip relative to the barrel end 20. Preferably the mount 28 has an outside diameter to be closely received into the bore 21 to support the clip 26a and shaft 22.

FIG. 2B shows another fixture embodied as a barb 26b. The barb 26b, to be interchangeably mounted on the shaft 22 includes a mount 28 as described above. As shown the barb 26b extends from the mount 28 for piercing and retaining a lure component or bait as hereinafter described.

Other fixtures such as hooks, loops and other types or clips and devices for holding a lure component may be provided.

FIG. 2C shows a cone 26c having a cylindrical base 34 to be closely received into the bore 21 for mounting the cone 26c at the barrel end 20.

To cooperate with the loader 12 and fixtures, the device 10 includes elastic bands 36. The bands 36 are of a size to be placed over the handle 14 in a non-expanded or slightly expanded condition and to be expanded by moving them by rolling or sliding over the transition surface 18 onto the barrel as will hereinafter be described. The bands 36 contract about the components to band them together or to provide a connection for other components such as hooks or the like. As shown in FIG. 1, an inventory of bands 36 may be stored on the handle 14. Where the knurled wheel 32 is provided, the shaft 22 is removed from the handle 14 and barrel 16 and the bands 36 are disposed there along.

Figure 5:
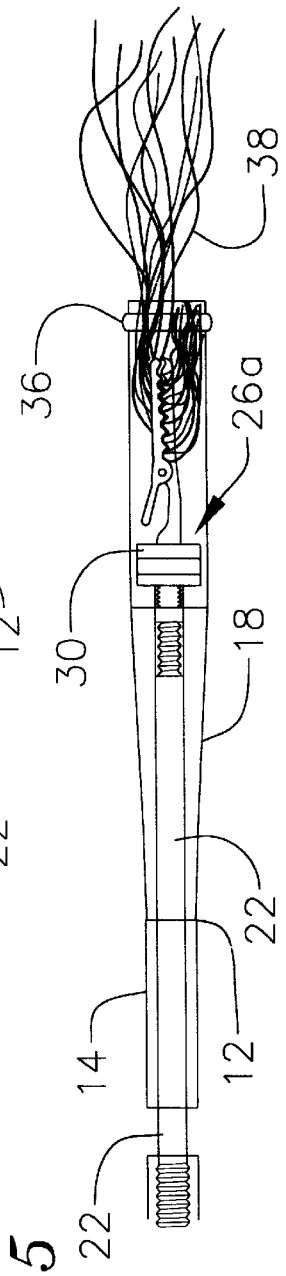
Figure 6:
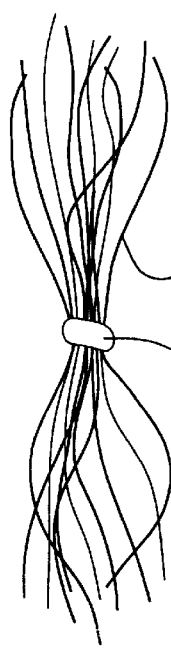
FIG. 6 illustrates the skirt or hackle banded according to the present invention.
Figure 7:
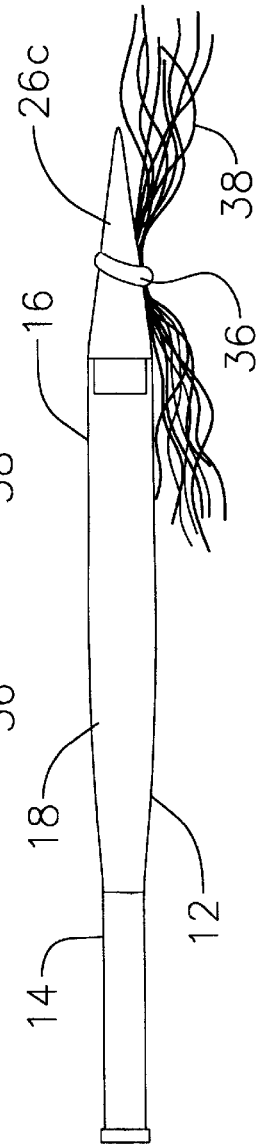

With reference to FIGS. 4–8 the use of the device 10 will now be described. The clip 26a is secured to the threaded end 24 of the shaft. The fisherman gathers together rubber or silicone strings, feathers or the like to define a first component skirt or hackle 38 (hereinafter referred to collectively as hackle 38) for a lure. The gathered material is then placed and retained by the clip 26a, at for example, one-half or the mid-point thereof. As shown in FIG. 5, the shaft 22 is withdrawn relative to the handle 14 and barrel 16 to partially draw the hackle 38 into the bore 21. A band 36 is moved from the handle 14 over the transition surface 18 onto the barrel 16 expanding the band 36. The band 36 is thereafter moved from the barrel end 20 whereupon its contracts, constricts about and bands the hackle 38 together. The shaft 22 is extended to extend the clip 26a from the bore 21 and the banded hackle 38 is removed from the clip 26a. The clip 26a is removed from the threaded shaft end 24 and the shaft end 24 is withdrawn into the bore 21. The cone 26c is positioned at the barrel end 20 as shown in FIG. 7. The apex of the cone 26c is inserted through the band 36 and the band 36 is moved and elastically expanded over the cone 26c onto the barrel 16. The cone 26c is removed and the barb 26b is coupled to the shaft end 24 as shown in FIG. 8. A second lure component, for example and artificial worm 40, is pierced by the barb 26b to retain the worm 40 adjacent the barrel end 20. The worm 40 is partially withdrawn into the bore 21 and the band 36 with the hackle 38 is moved from the barrel end 20 onto the worm 40 and the band 36 contracts about and bands the hackle 38 to the worm 40 producing an artificial bait or lure 42 as shown on FIG. 9. A hook 44 is then inserted through the lure 42, the hook 44 having an eyelet 46 for attachment to a fishing line.

As can be appreciated, the fisherman can construct lures of different colors and configurations. For example, the device 10 can be used to couple different first and second components of a fishing lure together, to band a different component to an existing lure as by banding an artificial worm 40 to a spinner or the like. Further, a different hackle or foam flotation element can be attached to a fly. Also a hackle 38 can even be banded to live bait such as a nightcrawler or the like. The band 36 also serves to hold the lure or bait to the fish hook 44 in that it constricts the lure or bait about the hook 44. Thus there is less likelihood that the bait or lure will be lost.

Turning to FIG. 10, an artificial bait 46 fashioned according to the present invention is shown. The bait 46 includes a body 48 having a tail 50 and a head 52. The bait 46 is retained by the barb 26b and is partially withdrawn into the bore 21 and a band 36 is expanded by the loader and passed onto the bait 46 proximate the head 52. Thereafter a hook 44 may be passed through the bait 46 or between the bait 46 and band 36 to couple the bait 46 to the hook 44. The constricted band 36 about the bait 46 provides a connection for securing the bait 46 to the hook 44. The bait 46 need not be artificial and can be live bait such as a worm.

The elastic bands 36 may be fashioned from rubber, silicone or other elastic material. The loader 12 may be fashioned from plastic, metal or other rigid material.

While the loader 12 may have a handle 14 and barrel 16, it is to be understood that the shaft 22 could also function as the handle 14 by simply extending it from a configured barrel 16.

Figure 11:
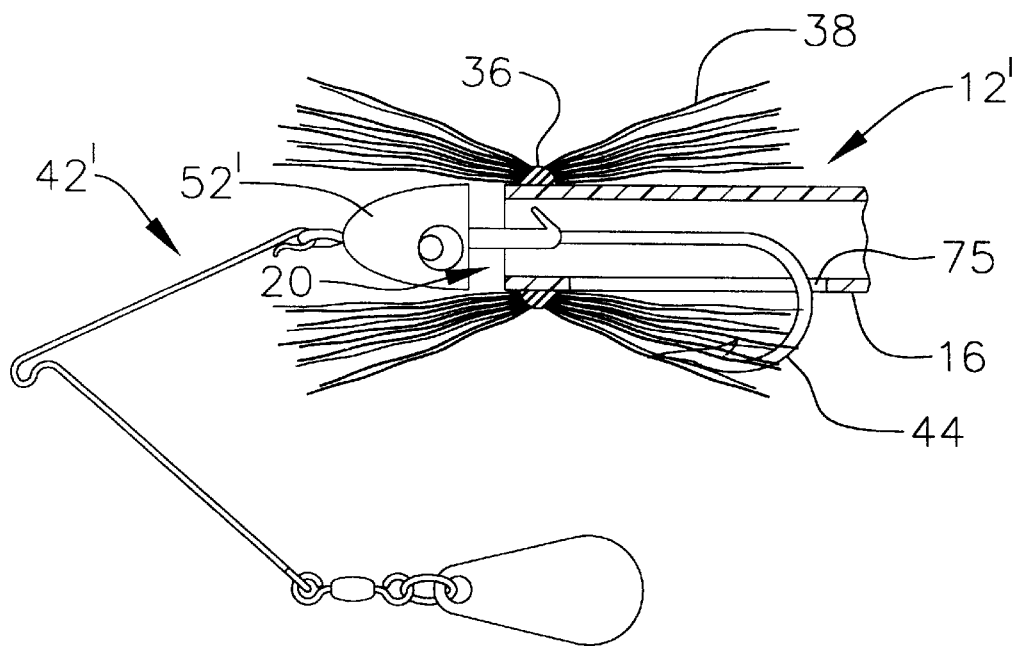
FIG. 11 shows the device according to the present invention for banding a spinner bait without removing the jig from the fishing line.

Turning to FIG. 11, a modified loader 12' which is adapted to dispose a band 36 on a bait or lure 42' without removing the bait or lure from the fishing line. As shown, the loader 12' has a barrel 16 including a slot 75 which extends longitudinally there along. While the slot 75 may extend to the end 20, preferably it is spaced longitudinally inboard of the end 20. The slot 75 has a width dimension to pass the hook 44 as shown so as located the head 52' of the lure 42' proximate the barrel end 20. It can be appreciated that the lure 42' need not be removed from the fishing line inasmuch as the loader 12' is used, according to this embodiment, from the hook end rather than the head end of the lure 42'.

Figure 12:
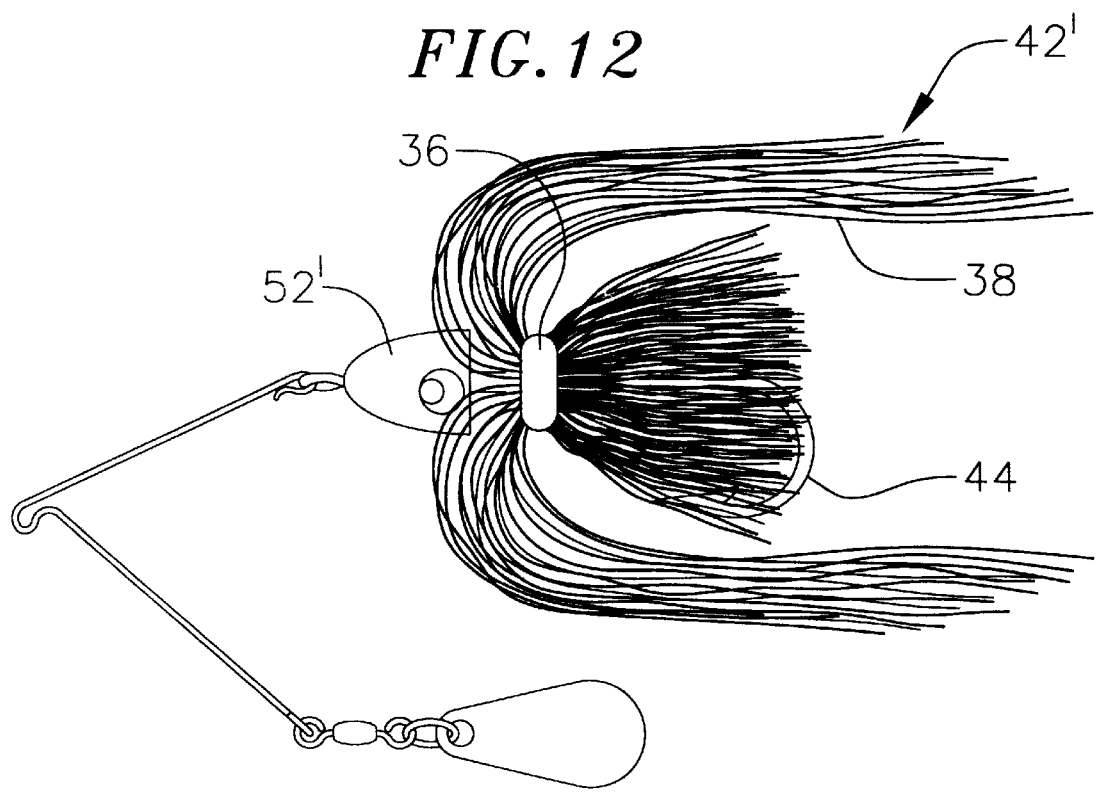
FIG. 12 shows a banded lure banded according to FIG. 11.

To connect a hackle 38 to the lure 42', the hackle 38 is first banded with a band 36 in the manner described above. The band 36 is thereafter expanded using the cone 26c and is passed onto the barrel 16 proximate the end 20 as shown. The hook 44 of the lure 42' is then passed though the expanded band 36 and through the slot 75 in the barrel 16. The band 36 and hackle 38 is rolled off of the barrel end 20 onto the lure 42' to connect the hackle 38 to the lure 42'. The hook 44 is withdrawn from the loader 12 resulting in the banded lure 42' shown in FIG. 12.

The loader 12 and bands 36 may be provided in various sizes to, for example, band components to larger deep sea fishing lures or small fresh water flies.

While I have shown and described certain embodiments of the present invention, it is to be understood that it is subject to many modifications and changes not departing from the spirit and scope of the claims.

I claim:

1. A device for placing band on bait for connecting bait first and second components comprising:

a loader including a barrel having at one end a retainer to hold the component against the end of the barrel;

said retainer being disjoined from said one end of said barrel;

an elastic band adapted to be received over a handle and to elastically expand as said band is passed from the handle to the barrel, said band contracting about the bait as it is moved from the barrel end, said band providing for a connection of the second component to the first component.

2. The device of claim 1 wherein said retainer is a barb.

3. The device of claim 1 wherein the retainer is a clip.

4. The device of claim 1 further including a coupling between the retainer and barrel end which provides for removal and replacement of the retainer on the barrel end.

5. The device of claim 4 including a plurality of replaceable retainers selected from the group consisting of a barb, hook, and clip.

6. The device of claim 1 wherein said barrel includes a bore extending longitudinally there through, the device further including a shaft disposed in the bore and a coupling at the end of the shaft for coupling the retainer to the shaft.

7. The device of claim 6 wherein said coupling is a threaded connection between the shaft and retainer.

8. The device of claim 7 wherein said shaft is rotatably mounted through the handle and barrel for rotation of the shaft to engage the threaded connection.

9. The device of claim 6 wherein said shaft is axially moveable to withdraw and extend the retainer from the barrel end.

10. A device for fashioning a fishing lure component comprising:

a loader having a barrel with a smaller diameter handle;

a elastic band to be received over the handle and elastically expanding as it is moved from the handle to the barrel;

a retainer at the end of the barrel opposite the handle to hold one or more components to be banded together for the component, said band moveable from the handle along the barrel and from the barrel end to contact and band said components together;

said retainer being disjoined from said end of the barrel opposite the handle.

11. The device of claim 10 wherein the retainer is a clip.

12. The device of claim 10 wherein said barrel includes a bore to mount a shaft having said retainer at one end thereof, said shaft axially moveable to withdraw and extend the clip from the barrel end.

13. The device of claim 10 wherein said retainer is a hooked barb adapted to penetrate and hold said component.

14. The device of claim 10 wherein said barrel includes a bore to mount a shaft having said retainer at one end thereof, said shaft axially moveable to withdraw and extend the barb from the barrel end.

15. The device of claim 10 including a retainer selected from a group consisting of a clip and a barb and a coupling at the barrel end for interchangeably mounting a retainer.

16. The device of claim 15 wherein said coupling is a threaded connection.

17. A device for fashioning any one of a plurality of fishing baits comprising:

a loader having a handle and a larger diameter barrel, said barrel having opposite said handle an end;

a retainer selected from the group consisting of a clip and a barb each adapted to hold a bait component;

a coupler at the barrel for interchangeably mounting a fixture to the barrel end;

an elastic band adapted to be placed over the handle and to expand as it is moved onto the barrel, said band constricting about the bait component held at the barrel end as said band is moved from the barrel.

18. A device for placing a band on a bait component to provide a connection for a hook or other components comprising:

a loader having a handle and a larger diameter barrel, said barrel having opposite said handle an end, said barrel including a bore to receive a shaft;

a retainer selected from the group consisting of a clip and a barb each adapted to hold a bait component;

a coupler at the for interchangeably mounting a retainer to the shaft, said shaft moveable to withdraw the retainer into and extend the retainer from the bore;

an elastic band adapted to be placed over the handle and to expand as it is moved onto the barrel, said band constricting about the bait component held at the barrel end as said band is moved from the barrel.

19. The device of claim 18 wherein said coupler is a threaded connection between the shaft and the retainer.

* * * * *